United States Patent [19]

Saidla

[11] Patent Number: 4,464,320
[45] Date of Patent: * Aug. 7, 1984

[54] REACTION INJECTION MOLDING SYSTEM FOR EXPANDED SYNTHETIC ARTICLES

[75] Inventor: Glen W. Saidla, Stratham, N.H.

[73] Assignee: Whitney & Company, Inc., Stratham, N.H.

[*] Notice: The portion of the term of this patent subsequent to Feb. 8, 2000 has been disclaimed.

[21] Appl. No.: 291,399

[22] Filed: Aug. 10, 1981

Related U.S. Application Data

[63] Continuation-in-part of Ser. No. 111,664, Jan. 14, 1980, Pat. No. 4,358,548.

[51] Int. Cl.$^3$ .................................. B29D 27/00
[52] U.S. Cl. .................................. 264/45.3; 264/455; 264/54; 264/328.6; 264/DIG. 5; 521/90; 521/99; 521/128
[58] Field of Search .................. 264/45.3, 45.5, 51, 264/54, DIG. 83, DIG. 5, 328.6; 521/99, 128, 90

[56] References Cited

U.S. PATENT DOCUMENTS

| | | | |
|---|---|---|---|
| 2,140,063 | 12/1938 | Talalay | 264/45.3 |
| 2,194,036 | 3/1940 | Talalay | 264/45.3 |
| 3,200,176 | 8/1965 | Baxter | 264/54 |
| 3,823,099 | 7/1974 | Doyle | 521/99 X |
| 3,970,732 | 7/1976 | Slaats et al. | 264/101 X |
| 4,073,840 | 2/1978 | Saidla | 264/51 X |
| 4,216,294 | 8/1980 | Halle et al. | 521/99 |
| 4,308,226 | 12/1981 | Wingard | 264/45.3 |

FOREIGN PATENT DOCUMENTS

| | | | |
|---|---|---|---|
| 576492 | 5/1959 | Canada | 264/54 |
| 1028908 | 5/1966 | United Kingdom | 264/54 |
| 1137465 | 12/1968 | United Kingdom | 264/54 |

OTHER PUBLICATIONS

Ferrigno, T. H., "Rigid Plastics Foams", New York, Reinhold, c. 1963, pp. 24-29.
Bender, Rene J., "Handbook of Foamed Plastics", Libertyville, IL, Lake Publishing Corp., c. 1965, pp. 132, 133, 176, 177.
"Hackh's Chemical Dictionary", Fourth Edition, completely revised and edited by Julius Grant, New York, McGraw-Hill, c. 1972, pp. 538-542.
Kubiak; R. S. and Harper, R. C., "The Development of Non-Urethane Materials for the RIM Process", 45th Annual Technical Conference, 1980.
Reinforced Plastics/Composites Institute, The Society of the Plastics Industry, Inc., Section 22-C, pp. 1-7.

Primary Examiner—Philip E. Anderson

[57] ABSTRACT

A method of forming reinforced synthetic articles of polyester resin by reaction injection molding techniques comprising combining a set of reactants including a major base mass of polyester resin in fluid form, at least one polyester cure accelerator, a selected quantity of isocyanate, a surfactant, and an additive that is highly exothermically reactive with at least one other component in the mixture. The isocyanate is added in sufficient quantity to react with at least one other component in the mixture to provide mold filling and shrink-resistant quantities of carbon dioxide throughout the mixture. The resultant mixture is injected into a mold prior to substantial reaction. The additive is allowed to react and the heat produced by this exothermic reaction is effective to trigger and accelerate gas forming soon after injection. The gas formation generates pressure to expand the polyester base resin mass and maintain pressure through the curing reaction of the accelerator with the polyester resin.

13 Claims, 11 Drawing Figures

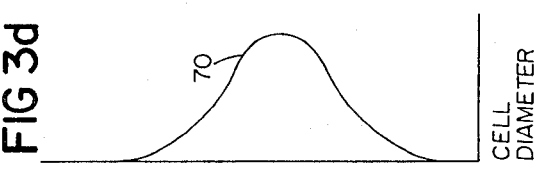
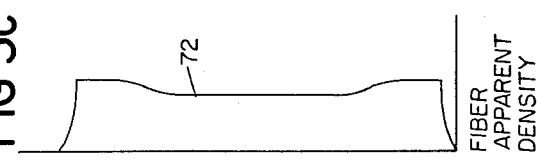
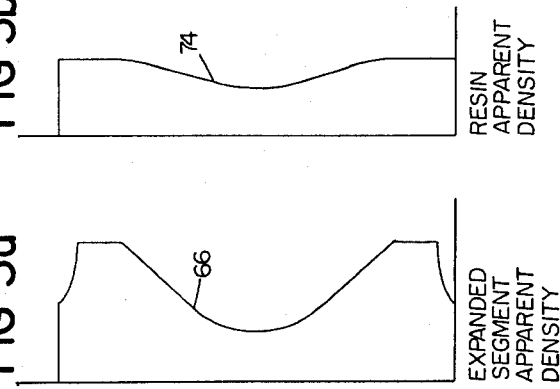
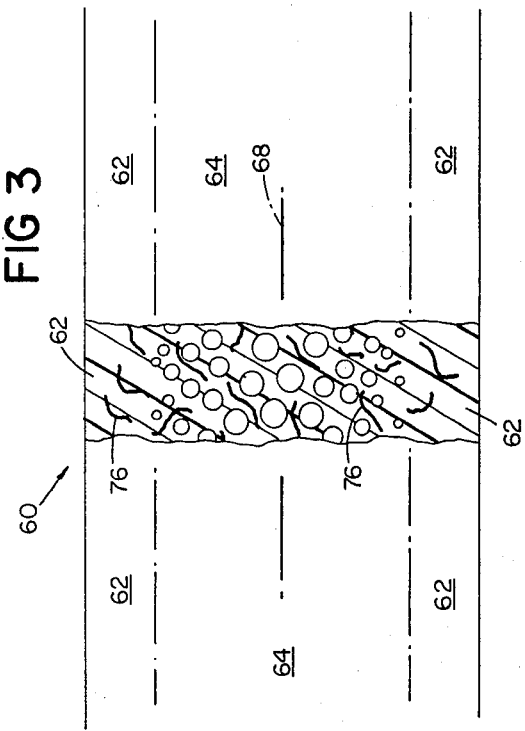
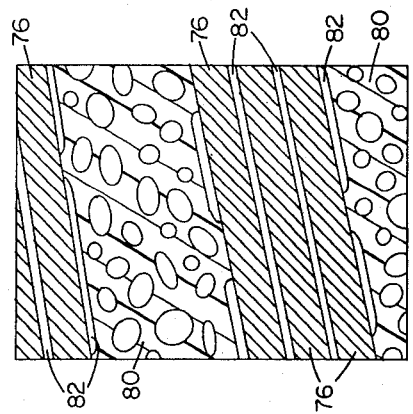
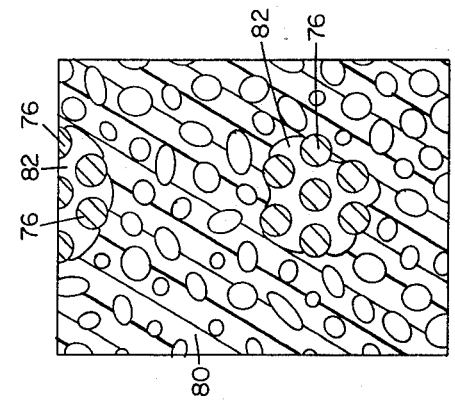
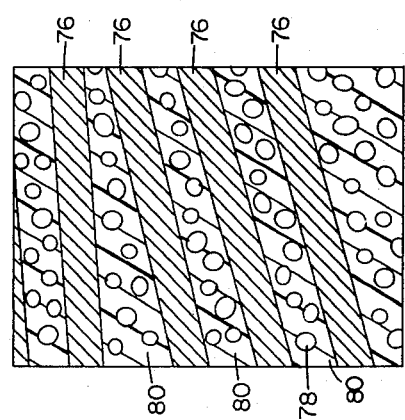
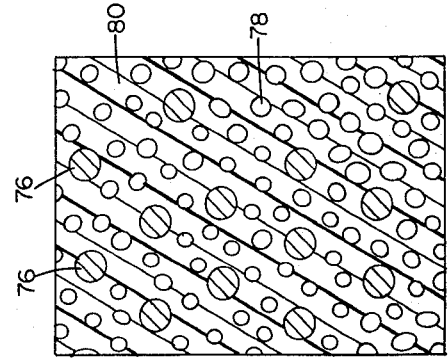

REACTION INJECTION MOLDING SYSTEM FOR EXPANDED SYNTHETIC ARTICLES

This application is a continuation-in-part of application U.S. Ser. No. 111,664, filed Jan. 14, 1980 and now U.S. Pat. No. 4,358,548.

FIELD OF THE INVENTION

This invention relates to reaction injection molding (RIM).

BACKGROUND OF THE INVENTION

Reaction injection molding (RIM) is a molding process for synthetic plastic materials wherein one or more components are injected into a mold under conditions that cause a reaction to quickly occur. The reaction and gellation are completed quickly, and typically demolding is possible between one or two minutes after injection.

Prior RIM systems have employed polyurethane as the major synthetic resin component of the process. However, polyurethane has certain known disadvantages, e.g. high resin cost, poor heat distortion properties, low modulus of elasticity, etc. Also, urethane is formed from a mixture of two approximately equal volume components. Due to poor mixing characteristics of two fibre containing liquids, the potential level of fibre reinforcement is substantially reduced. Urethane components must also be combined in exact stoichiometric proportions, which requires accurate and expensive handling equipment.

Attempts have previously been made to use polyester resin as the main resin constituent in the system to take advantage of its highly desirable molding qualities, e.g. lower cost (approximately ⅔ that of polyurethane), higher heat distortion temperature, high modulus of elasticity, increased reinforcement capability, and increased product potential, i.e. for production of rigid parts. These systems have typically employed nitrogen gas evolved from azo compounds in the injected mixture. However, the nitrogen reaction generates insufficient pressure, i.e. less than the 40 to 50 psi typically required for RIM processes, to resist shrinkage of the polyester, since shrinkage results in unsatisfactory sinks and surface crazing. Further, the system has a short pot life due to assay loss of the foaming agent from the mixture.

It is desirable to provide a RIM system with components that preferably have an extended pot life prior to mixing, that react quickly upon mixing to expand the mixture to fill the mold cavity and cure the resin in the expanded form, and that generate sufficient pressure within the mixture to resist shrinkage. It is desirable that the system further be capable of being substantially reinforced, and produce a completed article that can be demolded soon after injection, e.g. within three minutes.

SUMMARY OF THE INVENTION

According to the invention, a method of forming a reinforced synthetic article of polyester resin by reaction injection molding techniques comprises combining a set of reactants which includes a major base mass of polyester resin in fluid form, at least one polyester cure accelerator, a selected quantity of isocyanate, a surfactant and an additive highly exothermically reactive with at least one component of the set, the isocyanate being present in sufficient quantity to react with at least one component of the set to provide mold-filling and shrink-resistant quantities of carbon dioxide throughout the mixture, injecting the resultant mixture into a mold prior to substantial reaction and allowing the additive to react, whereby heat produced by the exothermic reaction of said additive is effective to trigger and accelerate gas formation at least soon after the injection to generate pressure to expand the polyester base resin mass and maintain the pressure through the curing reaction of the accelerator with the polyester resin.

In preferred embodiments: the polyester cure accelerator is also reactive with the isocyanate in the presence of heat and the isocyanate is present in sufficient quantity to react with the accelerator to provide mold-filling and shrink-resistant quantities of carbon dioxide throughout the mixture, preferably the polyester cure accelerator being an organic hydroperoxide, the proportions of all ingredients in the mixture are predetermined to assure that the preponderant quantity of $CO_2$ produced from said isocyanate results from said reaction, and more preferably the organic hydroperoxide being t-butyl hydroperoxide; the additive is highly exothermically reactive with the isocyanate and the exothermic reaction between the additive and a portion of the isocyanate produces heat effective to trigger and accelerate the gas forming reaction, preferably the additive being a tertiary amine or a potassium salt; the expansion reaction occurs within the order of about 5 seconds, i.e. almost instantaneously, to one minute after injection into the mold, and the gellation occurs within 30 seconds to three minutes thereafter; the article is reinforced by reinforcement elements combined with the polyester resin in the mixture, the reinforcement elements are provided in a condition free to move with the fluid polyester resin, and the expansion of the resin is effective to produce an article with the reinforcement elements redistributed through the cross-section of the article as a result of the resin expansion, preferably the reinforcement elements being initially provided in the form of aggregations, the mixing conditions being effective to substantially penetrate the aggregations and wet the surface of individual elements within the aggregations, and the expansion of the resin being effective to spread apart the individual elements into a relatively more diffuse distribution through the resin prior to cure; more preferably the reinforcement aggregations comprise bundles of fibre filaments, the mixing conditions are effective to cause the resin to penetrate the exterior of the bundles and wet the surfaces of the individual filaments, and the expansion is effective to cause the bundles of filaments to effectively spread apart the filaments in each bundle and move individual filaments of adjacent bundles closer to one another to provide improved inter-relationship of reinforcing filaments of adjacent bundles in the cured article, with resultant increased strength of the part; the method includes enabling the interior of a layer of resin to rise to a higher temperature level than an outer surface of the layer in a manner to cause formation of more bubble volume in the interior relative to the outer portion prior to the cure whereby a variable density reinforced article is produced having lower density in the region of the neutral axis of the layer and higher density in the outer region while the reinforcement elements are intimately bonded with the resin throughout; and the presence of water and hydrogen peroxide in the composition is limited to a weight ratio of the order of 1:25 of the water and hydrogen peroxide to active components of the organic hydroperoxide to thereby cause the gas expansion to form the expanded article with a substantially nonporous exterior surface.

According to another aspect of the invention, a method of forming a reinforced synthetic article of polyester resin by reaction injection molding techniques comprising combining a set of reactants to form a mixture which includes a major base mass of polyester resin in fluid form, at least one polyester cure accelerator, a selected quantity of isocyanate, and a surfactant, the isocyanate being present in sufficient quantity to react with at least one component of the set to generate sufficient quantities of carbon dioxide throughout the mixture to cause the mixture to fill the mold and to prevent shrinkage thereof, injecting the resultant mixture into a mold prior to substantial reaction and allowing the mixture to react to form gas and generate pressure to expand the polyester base resin mass and maintain the pressure through the curing reaction of the accelerator with the polyester resin. In preferred embodiments of this aspect of the invention, the mold is heated and the heat of the mold is effective to trigger and accelerate gas forming at least soon after the injection.

PREFERRED EMBODIMENT

The structure and operation of a preferred embodiment of the invention will now be described, after first briefly describing the drawings.

DRAWINGS

FIG. 3 is a side view, partially in section, of a RIM product produced according to the preferred embodiment, while FIGS. 3a, 3b, 3c and 3d are representative profiles of combined apparent density, resin apparent density, fiber apparent density and average cell diameter, respectively, taken along the cross section of FIG. 3;

FIG. 4 is a representation of a microphotograph of an end view in section of fibre bundles in a RIM product produced according to the preferred embodiment, while FIG. 5 is a side section view thereof; and FIG. 6 is a similar representation of a microphotograph of an end view in section of fibre bundles in an undesirable product, while FIG. 7 is a side section view thereof.

Expansion Reaction

Figure 1:
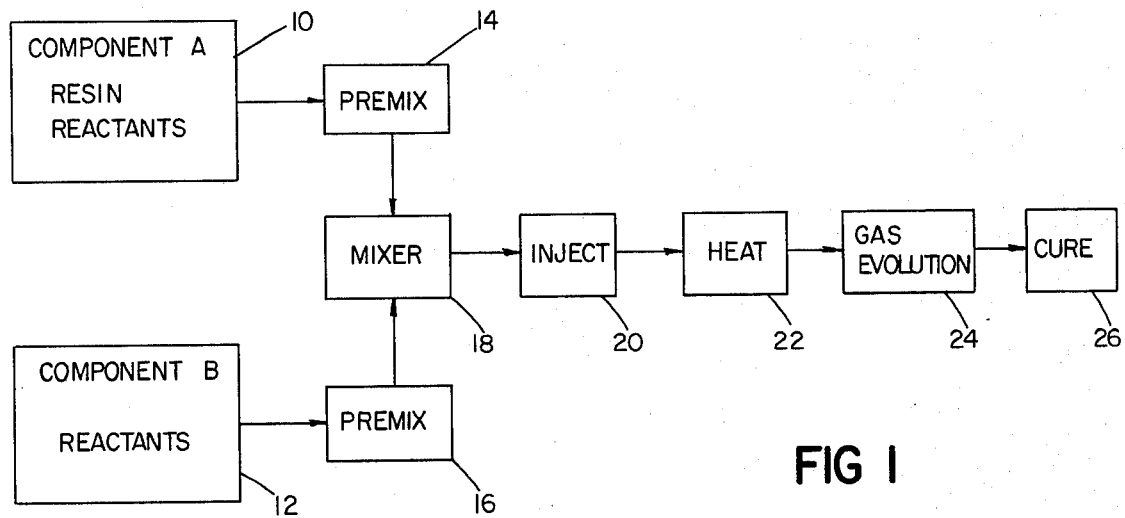
FIG. 1 is a flow diagram of the reaction injection molding sequence according to the preferred embodiment.

Referring to FIG. 1, in the preferred embodiment the set of reactants are prepared in two components 10, 12. The first component, Component A, substantially the larger of the two, is primarily comprised of the base mass of polyester resin. The remaining component ingredients are chosen and arranged to avoid reaction prior to final mixing. In this preferred embodiment, Component B is comprised of an expansion agent premixture (primarily organic isocyanate with surfactant to improve gas cell quality).

As mentioned, the organic isocyanate is reactive, upon mixing, with an ingredient of Component A to evolve carbon dioxide gas within the resin mass. In preferred embodiments, the isocyanate reacts with an organic hydroperoxide to produce gas, chiefly carbon dioxide, and a resinous residue. The residue is identified as an amine oxide polymer, from the following reaction that is believed to occur:

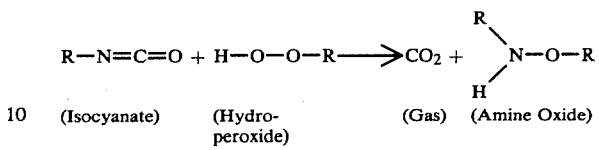

(Isocyanate)  (Hydro-   (Gas)   (Amine Oxide)
              peroxide)

Examples of suitable isocyanates are aromatic isocyanates, (and isocyanates having a reactivity comparable to aromatic isocyanates e.g. aliphatic isocyanates, e.g. Mobay's ethylene bis(4-cyclohexol isocyanate)), including monoisocyanates, e.g. n-butyl isocyanate, phenyl isocyanate; diisocyanates, e.g. tolylene diisocyanates, diphenyl methane diisocyanates (methyl diphenyl isocyanate or "MDI"), napthalene diisocyanates, phenylene diisocyanates; triisocyanates, e.g. triphenylmethane triisocyanates; and polymeric polyisocyanates. Suitable organic hydroperoxides include alkyl hydroperoxides such as t-butyl hydroperoxide and butanone hydroperoxide (methyl ethyl ketone peroxide or "MEKP"). Both reactants may be present as a monomer or as various polymeric homologues.

The gas forming reaction is triggered and accelerated by exothermic reaction of an additive also present in the system.

The presence of undesirable ingredients in the organic hydroperoxide, i.e. water and hydrogen peroxide, is limited to prevent side reactions between these impurities and the isocyanate before the proper gas expansion reaction, in particular when the highly reactive monoisocyanates are employed. The weight ratio of the total water and hydrogen peroxide to the active components of the organic hydroperoxide should be less than 1:25 for the formation of nonporous surfaces, i.e. skins, on the expanded product. In other embodiments, i.e. where surface quality is less critical, the presence of water is less limited to allow at least a portion of the gas evolution to occur via reaction between the isocyanate and water.

The A and B components are separately premixed 14, 16, combined 18, and immediately injected 20 into the mold cavity. The heat 22 from the highly exothermic reaction of the additive almost immediately triggers and accelerates the isocyanate and organic hydroperoxide gas-evolving reaction. In the preferred embodiments, the additive is a urethane catalyst introduced with the A component at about 2 percent of the resin weight, i.e. approximately 10 to 20 times the amount typically employed in a urethane RIM reaction. The gas evolved expands the resin mass to fill the mold cavity under pressure, typically 45 psi, while continued heat generation causes the polyester cure accelerator to react to cure the polyester in the fully expanded state 26. The process from injection to a gellation suitable to allow demolding the article occurs over between 30 seconds and three minutes, depending upon the conditions selected.

In the preferred embodiment, the organic hydroperoxide is t-butyl hydroperoxide (present at about ½ to 1 percent of the resin weight) which reacts with the organic isocyanate to generate carbon dioxide, and which, at elevated temperatures, reacts to cure the polyester resin. This particular organic hydroperoxide is substantially unreactive with the resin at room temperature, typically having a shelf life of twenty hours, which may be extended with inhibitors, e.g. hydroquinone, and is therefore introduced into the system in the A component with the resin and the additive. In RRIM (Reinforced Reaction Injection Molding) processes, reinforcing fibers and also introduced into the mixture with this component.

Process

Figure 2:
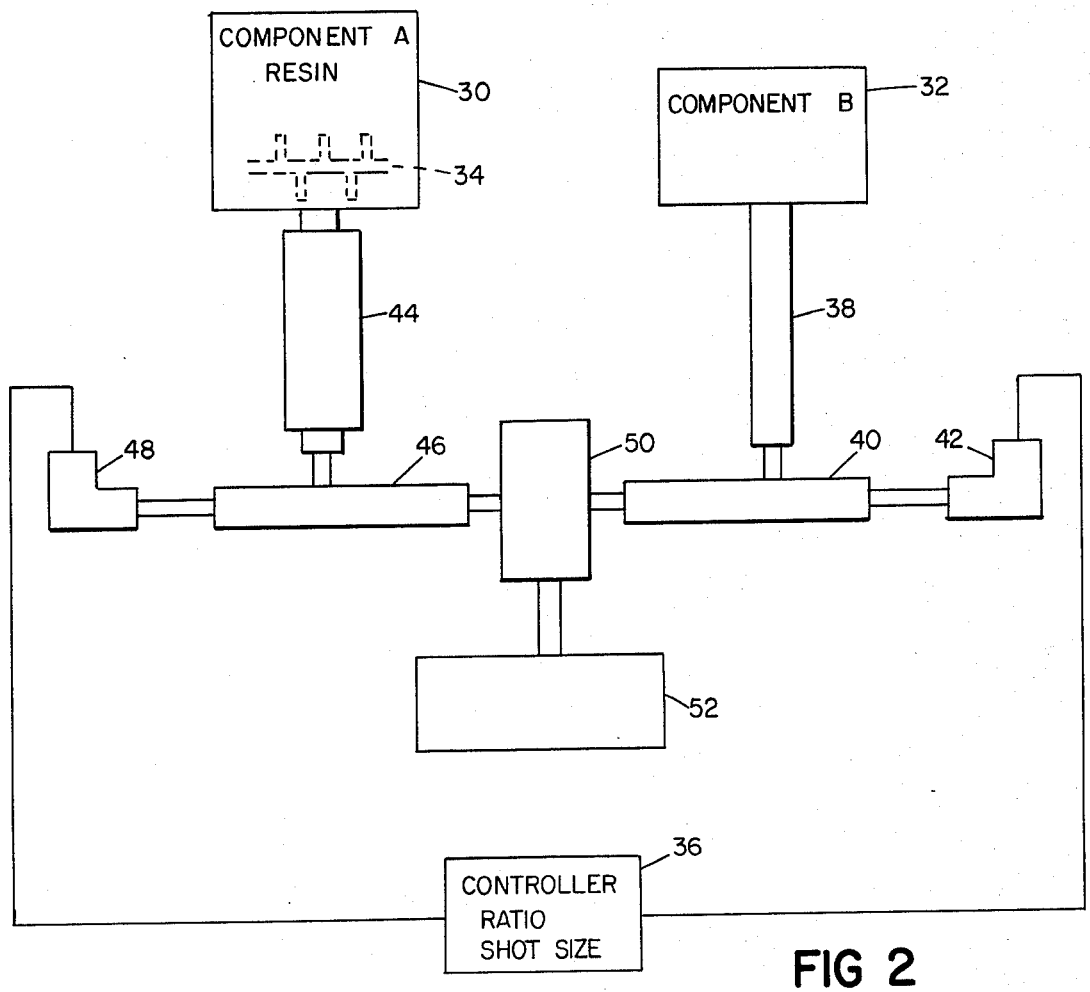
FIG. 2 is a diagrammatic view of a reaction injection molding apparatus employing the preferred component system.

Referring now to FIG. 2, Component A and Component B are prepared separately 30, 32. Component A, consisting primarily of the base mass of polyester resin, is of substantially larger volume. Component A (30) also contains reinforcing fibres, in RRIM processes, which are dispersed into the mixture by means of beater bars 34. The weight ratio of Component A to Component B is preset at controller 36 which also controls the total amount of mixture to be introduced into the mold for each piece, i.e. "shot size".

Component B (32), without reinforcing fibres, is fed through a static mixer 38 into a progressive cavity screw 40 operated via servo valve 42 controlled by controller 36.

The temperature of the final mix is controlled by feeding Component A through temperature regulator 44 into second progressive cavity screw 46 controlled by separate servo valve 48, also controlled by controller 36.

Component A and Component B are combined in mixhead 50 and injected into mold cavity 52. The reaction between the components starts almost immediately, e.g. within 5 to 30 seconds, depending upon selected parameters, so mixing and injecting occur in quick succession.

The gas evolution reaction expands the mass of resin, carrying the reinforcing fibres therein, to fill the mold cavity under pressure. The resin subsequently, typically between thirty seconds and three minutes, gels in the expanded state. The mold 52 is opened and the completed article is removed.

The mold 52 is closed and clamped, and the process is repeated.

Product Structure

In FIG. 3, a RIM product 60 produced according to the preferred embodiment is shown in cross section. The cured, expanded polyester, typically 0.250 inch thick, of the product 60 is comprised of skin 62, typically 0.040 inch thick, formed at both surfaces against the mold where little or no gas formation occurs, and the expanded center segment 64, typically 0.170 inch thick. The expanded segment 64 has differential apparent density (66, FIG. 3a), with the lowest density along the neutral axis 68 through the center of product 60. This profile of apparent density is caused by differential temperature within the material during the expansion process, the higher temperatures along neutral axis 68, causing the gas generation to initiate along the axis and thereby create larger gas bubbles indicated by curve 70 in FIG. 3d. The profile of fibre reinforcement apparent density (72, FIG. 3c) is also lower along neutral axis 68 because the gas bubbles force some of the fibre-carrying resin away from the axis, but the apparent density variation across the section is less pronounced than the variation of the apparent density of the resin (74, FIG. 3b).

Reinforcing fibres 76, shown only representatively in FIG. 3, are shown in microphotograph representations in FIGS. 4–7. The reinforcing fibres, typica In prior, known polyester foaming systems, the gas-generation occurs almost immediately. In the present invention, where desired, by selection of the ingredients a degree of delay can be achieved, e.g. to allow the mixture to force out air 82 trapped in the mold and wet out any reinforcing fibres 76 that may have been provided. In instances of poor mold filling, i.e. where air is not forced out to allow fibre wetting (as shown in FIGS. 6 and 7) the fibres 76 in the bundle remain close together and trap air 82. The fibres 76 have minimal contact with the surrounding cured resin 80 and therefore impart significantly less strength to the article.

Example of the Gas Generating Reaction

In order to provide an example of the gas generating capability of the two components, i.e. an organic isocyanate and an organic hydroperoxide, a series of reactions was observed using different weight ratios of the components. The specific isocyanate reactant used was a commercial MDI agent comprising MDI monomer and higher polymeric hololugues (Mondur MR, from Mobay Chemical Co., Pittsburgh, PA). The hydroperoxide reactant used was a commercial MEKP agent comprising a 60 percent solution of MEKP and higher polymeric homologues in an inert solvent, dimethyl phthalate (DDM from the Lucidol division of Pennwalt Corp., King of Prussia, PA).

For each experiment, the two reactants were weighed into a 50 gram cup and mixed together at room temperature (about 68° F.) and ambient pressure for about 30 seconds. The resulting reaction was significantly exothermic. The evolved gas was then measured, as summarized in the following table:

TABLE 1

| Ratio by Weight of MDI Agent to MEKP Agent | ml of Gas per Gram of Mixture |
|---|---|
| 0.10 | 4.9 ml/g |
| 0.19 | 115.0 ml/g |
| 0.48 | 111.0 ml/g |
| 0.91 | 58.3 ml/g |
| 1.67 | 55.4 ml/g |
| 3.13 | 48.4 ml/g |
| 6.69 | 14.1 ml/g |
| 9.65 | 3.3 ml/g |

The results show that the gas evolved per gram of mixture peaks at about 140 ml/g mixture at an MDI to MEKP agent ratio between about 0.24 and 0.30. (When the weights used are corrected to remove the solvent weight, the maximum amount of gas evolved by the reactants increases to about 180 ml/g corrected mixture, which is within the range theoretically predicted by the above reaction.)

The above gas generating reaction is advantageously used to expand various resins, e.g. polyester, vinyl esters, bis-phenyl A, silicone, epoxies, thermoset acrylics, and will also expand other dissimilar material, e.g. motor oil or even cement. The gas generated can be controlled to produce a wide range of densities of products. Additionally, the reaction can be used to produce a resinous product of microcellular composition that does not shrink during curing. Because the resultant cell structure can be strong (and strengthened by the amine oxide reaction product) the reaction can be employed to extend resins in high density applications, e.g., 30 lbs/ft$^3$ to 60 lbs/ft$^3$, and thus can supplant use of special extenders such as preformed glass spheres added to resin, and may also be used in high density RIM applications where limited exansion is required to fill the mold, i.e. where the expansion reaction is employed primarily for mold filling as opposed to reducing material usage.

Use of the Gas Generating Reaction in an Unsaturated Polyester Resin System to Produce a RIM Product The unsaturated polyester resin which comprises most of Component A may be prepared by the condensation of an unsaturated dicarboxylic acid, such as maleic or fumaric acid; with a glycol or mixture of glycols, such as ethylene glycol; propylene glycol; 1,4-butanediol; 1,6-hexandiol; or diethylene glycol. Saturated acids, e.g. phthalic acid, sebacic acid, or adipic acid, are sometimes included in the composition to reduce the amount of unsaturation in the final product, making it more flexible and tougher. In many instances it is desirable to use a polyester resin which is substantially free of hydroxyl groups or carboxyl groups; that is, the resin has a hydroxyl number of less than 15, preferably less than 10 and most preferably substantially zero, and an acid (carboxyl) number of less than 15, preferably less than 10, and most preferably substantially zero, but higher hydroxyl and/or higher carboxyl resins are operable, according to the invention, because the reactive components are mixed together and immediately injected. In such cases a polyisocyanate may be used, and the final product may contain amide, urea or urethane linages. In the case of a polyester base resin, the resulting product may be a polyester urethane.

There is customarily added to the unsaturated polyester resin a vinylic monomer. This vinylic monomer serves as a solvent or diluent for the unsaturated polyester resin and as a co-monomer therefor. Such vinylic monomers are usually referred to as cross-linking agents for the unsaturated polyester resin. Examples of such cross-lining monomers are styrene and dialkyl phthalate.

Component B for the expansion of an unsaturated polyester resin is preferably comprised of a mixture (16, FIG. 1) of the reactive organic isocyanate and a surfactant. The surfactant, which is used to control the size and size distribution of cell-forming bubbles, can be any suitable agent (preferably non-ionic) that adjusts the surface tension to promote the desired cell formation when organic hydroperoxide is reacted with the isocyanate. To make a commercially available premixed expander, a low hydroxyl surfactant, non-reactive with isocyanate is prepared, with ratio of isocyanate to surfactant between about 95 to 5 down to 85 to 15, respectively, by weight. Preferably a silicone such as a polyoxyalkylene polysiloxane polymer is employed. (Such premixed expander has a long shelf life.)

The polyester resin (Component A) is mixed (14, FIG. 1) with t-butyl hydroperoxide and an additive that is highly exothermically reactive with the isocyanate in Component B. Reinforcing fibres are also introduced into the Component A mixture.

At the time expansion is desired reactive quantities of Component A and Component B are combined (18, FIG. 1) in a mixer head (50, FIG. 2) and injected (20, FIG. 1) into the mold cavity (52, FIG. 2).

In the preferred embodiment, the reaction of the additive, typically a urethane catalyst, e.g. a tertiary amine, with the organic isocyanate begins almost immediately with high exotherm (22, FIG. 1). This, in turn, triggers and accelerates the reaction between the organic isocyanate and the organic hydroperoxide which generates additional heat and the gas evolution reaction 24 of the isocyanate and the hydroperoxide, in the presence of the surfactant, is noted at an exothermic temperature of about 95° F. (measured in a 50 gram cup). The induction period (between mixing of the A and B components and the principal gas evolution reaction) typically occurs in the order of about five seconds to one minute. The gellation reaction 26 between the organic hydroperoxide and the polyester resin, occurs after between 30 seconds and three minutes at about 140° F., again measured in a 50 gram cup.

As gas is evolved from the reactants, the resinous mass expands and the excess hydroperoxide serves to gel and cure the polyester. The resulting cured resin is a solid of fine uniform cell size. Examination under magnification reveals a brownish substance in the cell structure. It is believed that this substance, an amine oxide polymer reaction product, contributes (e.g., as a reinforcing "lining" or "back bone") to the strength of the cell walls.

Advantageously, the gas expansion system does not interfere with curing of the resin, the system is simple and can be used with conventional equipment, and no special temperatures or handling is required to avoid explosions, toxic effects or degradation.

The resulting product has the advantageous properties of a polyester resin, and the product can be made essentially free of amide, urea or urethane linkages (e.g., by appropriately limiting the hydroxyl and carboxyl content of the resin used.)

EXAMPLES

The following examples of reaction injection molding an unsaturated polyester employing the reaction system were observed.

Component A of the RIM reaction was comprised primarily of polyester resin (31-001 supplied by Reichhold.

Component B was comprised of a mixture of 95 percent of the commercial MDI product described above (Mondur MR supplied by Mobay) and 5 percent surfactant (L-5340, a silicone surfactant from Union Carbide Co.).

EXAMPLE A

Component A was prepared by adding two grams of a tertiary amine accelerator (DABCO-8020, a rigid urethane foam catalyst triethylene diamine, supplied by Air Products of Allentown, Penn.), which is highly reactive with isocyanate, and 1 gram of t-butyl hydroperoxide (TBH-90, which is low in percentage of water and hydrogen peroxide impurities, from Lucidol) to 100 grams of the base polyester resin. An additional 20 grams of ¼ inch chopped reinforcement fibres were also added to the mixture. A mixer was activated to mix the ingredients and to disperse and wet out the reinforcing fibres.

Component B, comprised of the expansion agent premixture described above, was passed through a static mixer.

Component A and Component B were combined in a mixer head in a ratio of 10:1 and injected into a closed mold cavity. Reaction between the amine catalyst and the isocyanate was noted almost immediately by a rise in the exothermic temperature of the mixture. This was followed (after about five seconds, and at an exothermic temperature of about 95° F.) by evolution of substantial amounts of carbon dioxide gas which expanded the base mass of polyester resin to fill the mold. A continuous temperature rise was noted and pressure in the mold increased to approximately 45 psi. The expanded mass gelled at 140° F. after about 30 seconds and the finished product was removed from the mold after 1 minute.

The finished product had class A surfaces at both faces, i.e. suitable for finish coating without grinding or filling, e.g. for automobile trunks, hoods, fenders, bumpers, drip pans, computer housings and panels, etc., due to a substantially nonporous skin formed at each surface.

EXAMPLE B

The procedure of Example A above was repeated, but the TBH-90 low water, low hydrogen peroxide t-butyl hydroperoxide was replaced with TBH-70 (Lucidol) which had higher levels of these impurities. The process was observed to proceed substantially as in Example A, however the surface of the finished product was rough and somewhat porous and therefore not acceptable for surface applications.

OTHER EMBODIMENTS

Other embodiments are within the following claims. For example, articles formed according to invention may be prepared without reinforcement, or may be reinforced by placing reinforcing materials within the mold prior to injection. (In this case, where the quick gas evolving reaction is employed, the reinforcement would not be substantially wet out and would merely be encapsulated within the expanded material, however excess quantities of reinforcement can be employed to enhance strength, made possible by the fact that the A Component, by far the largest quantity, is available to carry fibres, hence many fibres can be used than in prior RIM systems, e.g. urethane RIM.)

Also, while RIM and RRIM techniques primarily identify systems employing two or more component systems, a one component system may be employed, e.g. a temperature sensitive single composition may be injected into a heated mold where the increased temperature causes gas evolution expansion and cure.

The surfactant could also be included with the base mass of resin in Component A as well as or instead of with the isocyanate (Component B).

These and other examples of RIM processes employing gas evolving reactions according to the invention are as follows:

EXAMPLE C

Component A was prepared by adding two grams of benzoyl peroxide and one gram of water to 100 grams of the base polyester resin. Component B was prepared by combining 0.3 gram of dimethyl aniline with 10 grams of the premixed expansion agent used in Example A. An additional 20 grams of ¼-inch chopped reinforcement fibres were also added to the mixture of Component A, which was mixed to disperse and wet out the reinforcing fibres.

Components A and B were combined in a mixer head and injected into a closed mold cavity. Reaction between the benzoyl peroxide and the dimethyl aniline to generate heat and cure the resin, and the gas evolving reaction between the isocyanate and the water occured substantially in unison, although gas evolution was noted prior to any buildup of temperature within the composition. The gas evolution expanded the resin mass which subsequently gelled and was removed from the mold.

EXAMPLE D

The procedure of Example A was repeated, but the additive in Component A was not included. The components were combined as in that example, and injected into a heated mold. The evolution of a substantial volume of carbon dioxide gas was observed about five seconds after injection as the exothermic temperature of the mass reached 95° F. The gas evolution expanded the resin within the cavity where it cured as before. Examination of the expanded product revealed that little skin formation had occurred at the article surfaces and that the density across the article was essentially constant.

EXAMPLE E

The procedure of Example A above was repeated, however the reinforcing fibres were not added to Component A. Instead a similar amount of fibre roving was placed in the mold before closing. The process proceeded as above. Examination of the finished product revealed that the reinforcement was not intimately bound in the expanded resin but was encapsulated in it, with some added strength being obtained because of the presence of the reinforcement.

I claim:

1. A method of forming a reinforced synthetic article of polyester resin by injection of a mixture into a closed mold and allowing it to react therein;
   comprising combining a set of reactants to form a mixture which includes
   a major base mass of polyester resin in fluid form, at least one polyester cure accelerator, a selected quantity of isocyanate, a surfactant and an additive highly exothermically reactive with at least one component of said set,
   said polyester cure accelerator comprising organic hydroperoxide,
   said reactants in said mixture being substantially free of hydrogen peroxide,
   said isocyanate being present in sufficient quantity to react to generate carbon dioxide throughout said mixture to cause said mixture to fill said mold and to prevent shrinkage thereof, and
   said additive comprising a compound highly exothermically reactive with said isocyanate,
   injecting the resultant mixture into a mold prior to substantial reaction,
   said reactants in said mixture being balanced
      to cause said additive to react highly exothermically with a portion of said isocyanate,
      to trigger and accelerate said isocyanate to react with at least said organic hydroperoxide to evolve said carbon dioxide gas at least soon after said injection to generate pressure to expand said polyester base resin mass and maintain said pressure
      and thereafter, after less than about three minutes following combining of said reactants, to cause a gellation reaction of said accelerator with said polyester resin to gel and solidify the expanded resin in pressured state, to form an expanded article.

2. The method of claim 1 wherein said additive reacts exothermically with said isocyanate to trigger and accelerate said gas forming reaction within thirty seconds after the combining of said reactants.

3. The method of claim 1 wherein said additive reacts exothermically with said isocyanate to trigger and accelerate said gas forming within five seconds after the combining of said reactants.

4. The method of claim 1 wherein said organic hydroperoxide is t-butyl hydroperoxide.

5. The method of claim 1 wherein said additive is an amine.

6. The method of claim 1 wherein said article is reinforced by reinforcement elements contained within the polyester resin combined in said mixture, said reinforcement elements are provided substantially in suspension in said fluid polyester resin, and said expansion of said resin is effective to produce an article with said reinforcement elements redistributed through the cross-section of said article as a result of said resin expansion.

7. The method of claim 6 wherein said reinforcement elements are initially provided in the form of aggregations, conditions of mixing are effective to substantially penetrate and open up said aggregations and wet the surface of individual elements within said aggregations, and said expansion of said resin being effective to spread apart said individual elements into a relatively more dispersed distribution through said resin prior to cure.

8. The method of claim 7 wherein said reinforcement aggregations comprise bundles of fibre filaments, conditions of mixing are effective to cause said resin to penetrate the exterior of said bundle and wet the surfaces of said individual filaments, and said expansion is effective to effectively spread apart the filaments in each bundle and move individual filaments of adjacent bundles closer to one another to provide a more homogeneous distribution of reinforcing filaments of adjacent bundles in the cured article, with resultant increased strength of said cured article.

9. The method of claim 1 including causing the interior of a layer of resin to rise to a higher temperature level than an outer surface of the layer to cause formation of more bubble volume in said interior relative to said outer portion prior to said cure whereby a variable apparent density reinforced article is produced having lower apparent density in the region of the neutral axis of said layer and higher apparent density in said outward region while said reinforcement elements are intimately bonded with said resin throughout.

10. The method of claim 1 wherein the presence of water and hydrogen peroxide in said composition is limited to a weight ratio of the order of 1:25 of said water and hydrogen peroxide to active components in said organic hydroperoxide to thereby cause said gas expansion to form said expanded article with a substantially nonporous exterior surface.

11. A method of forming a reinforced synthetic article of polyester resin by injection of a mixture into a closed mold and allowing it to react therein;

comprising combining a set of reactants to form a mixture which includes a major base mass of polyester resin in fluid form, at least one polyester cure accelerator, a selected quantity of ioscyanate, and a surfactant, said polyester cure accelerator comprising organic hydroperoxide, said reactants in said mixture being substantially free of hydrogen peroxide, said isocyanate being present in sufficient quantity to react to generate carbon dioxide throughout said mixture to cause said mixture to fill said mold and to prevent shrinkage thereof, injecting the resultant mixture into a mold prior to substantial reaction, said reactants in said mixture being balanced to cause said isocyanate to react with at least said organic hydroperoxide to evolve said carbon dioxide gas and generate pressure to expand said polyester base resin mass and maintain said pressure, and thereafter, after less than about three minutes following combining of said reactants, to cause a gellation reaction of said accelerator with said polyester resin to gel and soldify the expanded resin in pressured state, to form an expanded article.

12. The method of claim 11 wherein said mold is heated and the heat of said mold is effective to trigger and accelerate gas forming at least soon after said injection.

13. The method of claim 1, wherein said additive is a urethane catalyst.

* * * * *

UNITED STATES PATENT OFFICE
CERTIFICATE OF CORRECTION

Patent No. 4,464,320                    Dated August 7, 1984

Inventor(s) Glen W. Saidla

It is certified that error appears in the above-identified patent and that said Letters Patent are hereby corrected as shown below:

Col. 5, line 68, after "fibres," delete "typica" and insert
--typically 1/4" chopped strands of fibreglass .002 inch thick, are gathered into a bundle of sixty filaments bound by a phenolic resin binder. These strands are introduced into Composition A and mixed by means of beater bars 34.

--This mixing removes air and allows the resin to penetrate into the bundle between the fibres as shown in Figs. 4 and 5. When the gas generating reaction and gellation occurs, the fibres 76 in the bundle are forced apart by the formed gas bubbles 78 in complete contact with the surrounding cured resin 80. Further, the filaments of adjacent bundles are expanded to intermix to give still further strength properties. Each fibre 76 gives extensive reinforcement to the structure of the article.--

Col. 7, line 2, "exansion" should be --expansion--.

Signed and Sealed this

Twenty-sixth  Day of  March 1985

[SEAL]

Attest:

DONALD J. QUIGG

Attesting Officer

Acting Commissioner of Patents and Trademarks